United States Patent
Obrist et al.

(10) Patent No.: US 12,264,618 B2
(45) Date of Patent: Apr. 1, 2025

(54) POWER UNIT

(71) Applicant: Obrist Technologies GmbH, Lustenau (AT)

(72) Inventors: Frank Obrist, Lustenau (AT); Oliver Obrist, Lustenau (AT)

(73) Assignee: Obrist Technologies GmbH, Lustenau (AT)

( * ) Notice: Subject to any disclaimer, the term of this patent is extended or adjusted under 35 U.S.C. 154(b) by 0 days.

(21) Appl. No.: 17/190,095

(22) Filed: Mar. 2, 2021

(65) Prior Publication Data
US 2021/0277823 A1    Sep. 9, 2021

(30) Foreign Application Priority Data
Mar. 5, 2020 (DE) .......................... 102020001432.1

(51) Int. Cl.
| | |
|---|---|
| *F02B 75/18* | (2006.01) |
| *B60K 6/24* | (2007.10) |

(Continued)

(52) U.S. Cl.
CPC .............. *F02B 75/18* (2013.01); *B60K 6/24* (2013.01); *F01L 1/022* (2013.01); *F01L 1/024* (2013.01);
(Continued)

(58) Field of Classification Search
CPC .. F02B 75/18; F02B 75/40; F02B 2075/1808; F01L 1/022; F01L 1/024; F01L 1/047;
(Continued)

(56) References Cited

U.S. PATENT DOCUMENTS

| | | | | |
|---|---|---|---|---|
| 5,131,355 | A | * 7/1992 | Bukovics | ................ F02B 75/22 |
| | | | | 123/192.2 |
| 6,029,541 | A | 2/2000 | Schrick et al. | |

(Continued)

FOREIGN PATENT DOCUMENTS

| | | |
|---|---|---|
| CN | 107107728 A | 8/2017 |
| CN | 108474319 A | 8/2018 |

(Continued)

OTHER PUBLICATIONS

First Office Action for German Patent Application No. 10 2020 001 432.1, dated Jul. 10, 2020, 13 pages.
(Continued)

*Primary Examiner* — Kenneth J Hansen
*Assistant Examiner* — Kelsey L Stanek
(74) *Attorney, Agent, or Firm* — Westman, Champlin & Koehler, P.A.

(57) ABSTRACT

A power unit for a hybrid vehicle is provided with a twin-cylinder reciprocating piston engine, which has two pistons which are guided in two cylinders in tandem arrangement. Two counter-directional crankshafts are connected with the pistons by connecting rods. At least one generator is rotatable co-directionally to the first crankshaft and counter-directionally to the second crankshaft. A camshaft with valve cams are operatively connected with control valves. A flywheel mass element is arranged on the second crankshaft or on a flywheel mass compensating shaft, and a compensating camshaft are provided. The compensating camshaft includes at least one compensating cam element which is operatively connected with a linearly guided compensating mass.

10 Claims, 2 Drawing Sheets

Figure 1:
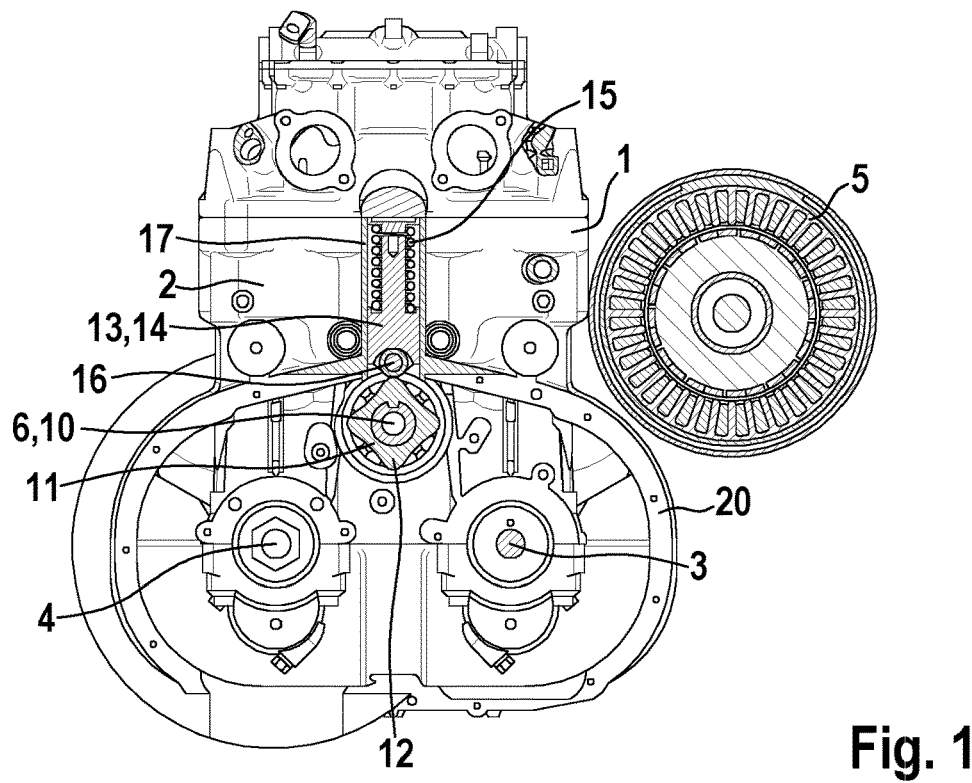

(51) Int. Cl.
  *F01L 1/02* (2006.01)
  *F01L 1/047* (2006.01)
  *F01L 1/14* (2006.01)
  *F02B 75/40* (2006.01)
  *F16F 15/30* (2006.01)

(52) U.S. Cl.
  CPC ............... *F01L 1/047* (2013.01); *F01L 1/14* (2013.01); *F02B 75/40* (2013.01); *F16F 15/30* (2013.01); *F02B 2075/1808* (2013.01)

(58) Field of Classification Search
  CPC .... F01L 1/14; F16F 15/30; F16F 15/20; F16F 15/12; F16F 15/1213; B60K 6/24; Y10T 74/2121; Y10T 74/2101; Y10T 74/2132
  USPC ................... 123/90.14, 192.1, 192.2
  See application file for complete search history.

(56) References Cited

U.S. PATENT DOCUMENTS

| | | | |
|---|---|---|---|
| 10,221,758 | B2 | 3/2019 | Laimboeck et al. |
| 10,844,783 | B2 | 11/2020 | Obrist |
| 2013/0199463 | A1 | 8/2013 | Pischinger et al. |
| 2017/0234214 | A1 | 8/2017 | Laimboeck et al. |
| 2019/0032554 | A1* | 1/2019 | Obrist ................ F02B 75/065 |

FOREIGN PATENT DOCUMENTS

| | | | | |
|---|---|---|---|---|
| CN | 109779746 | A | 5/2019 | |
| DE | 4028017 | A1 * | 3/1991 | ............... F01L 1/26 |
| DE | 10120448 | A1 * | 10/2002 | ............. F01L 1/022 |
| DE | 10 2008 033 777 | A1 | 3/2009 | |
| DE | 10 2010 025 002 | A1 | 12/2011 | |
| DE | 10 2014 115 044 | A1 | 4/2016 | |
| DE | 10 2016 102 048 | A1 | 8/2017 | |
| JP | S4956020 | A | 5/1974 | |
| JP | S57158617 | A | 9/1982 | |
| JP | S5962205 | U | 4/1984 | |
| JP | H07332026 | A | 12/1995 | |
| JP | 2019505437 | A | 2/2019 | |
| WO | 2007000317 | A1 | 1/2007 | |
| WO | 2017134294 | A1 | 8/2017 | |

OTHER PUBLICATIONS

International Search Report and Written Opinion for International Application No. PCT/EP2021/055363, dated Jun. 14, 2021, 12 pages.

First Chinese Office Action, for Chinese Patent Application No. 202110234905.5, dated Nov. 24, 2022, 7 pages.

Japanese Notice of Reasons for Rejection, for Japanese Patent Application No. 2021-034405, dated Oct. 17, 2023, 11 pages.

* cited by examiner

POWER UNIT

CROSS-REFERENCE RELATED TO APPLICATION

This application claims priority to German Patent Application No. 10 2020 001 432.1, filed on Mar. 5, 2020, the content of which is hereby incorporated by reference in its entirety.

DESCRIPTION

The invention relates to a power unit according to the introductory clause of Claim 1. Such a power unit is known for example from DE 10 2016 102 048 A1.

In the course of climate change, the aim exists to organize mobility by means of vehicles in as emission-free a manner as possible. One very promising possibility is the use of purely battery-electric vehicles. Such vehicles have disadvantages, however. In particular, the great production costs for the relatively large battery which is necessary for a sufficient range, are high. Moreover, the use of battery-electric vehicles requires a good charging infrastructure, which is not present in all regions of the world.

Against this background, plug-in hybrid designs are expedient, in which the vehicle has a comparatively small battery which has a sufficient electrical capacity for everyday journeys and can be recharged via the electricity grid. On the other hand hybrid vehicles have a power unit which is used for recharging the battery. Such a power unit, as is known from DE 10 2016 102 048 A1 named in the introduction, has for example a twin-cylinder reciprocating piston engine, which is coupled with a generator in order to generate current in the vehicle.

In such hybrid vehicles, the power unit is not operated continuously, but rather is switched on depending on the driving situation. As the twin-cylinder reciprocating piston engine of the power unit generates vibrations, this can lead to an unpleasant driving experience. In particular, the quiet and freedom from vibrations in the vehicle, known from purely battery-electric vehicles, can thus be interrupted by a power unit.

Against this background, the object of the invention consists in indicating a power unit which is distinguished by a particularly high degree of quiet running. Furthermore, it is an object of the invention to indicate a vehicle with such a power unit.

According to the invention, this problem is solved with regard to a power unit, particularly for a hybrid vehicle, and with regard to a vehicle, particularly a hybrid vehicle.

The invention is thus based on the idea of indicating a power unit, in particular for a hybrid vehicle, wherein the power unit comprises a twin-cylinder reciprocating piston engine which has two pistons which are guided in two cylinders in tandem arrangement, and two counter-directional crankshafts. The crankshafts are connected with the piston by connecting rods. The power unit has furthermore at least one generator which is rotatable co-directionally to the first crankshaft and counter-directionally to the second crankshaft. The power unit also has a camshaft with valve cams which are operatively connected with control valves. According to the invention, a flywheel mass element and a compensating camshaft are provided. The flywheel mass element is arranged on the second crankshaft or on a flywheel mass compensating shaft. The compensating camshaft comprises at least one compensating cam element which is operatively connected with a linearly guided compensating mass.

To prevent vibrations in the reciprocating piston engine, which can be transferred to the vehicle interior in a hybrid vehicle, it is advantageous to avoid mass forces of the first order and mass forces of the second order, preferably to eliminate them. In the power unit which has a generator, furthermore mass moments of inertia occur, wherein the flywheel mass element according to the invention is designed to compensate these mass moments of inertia. The compensating camshaft, on the other hand, serves to compensate mass forces of the second order. In this way, in interaction with the compensation of the mass moments of inertia and of the mass forces of the second order, a particularly high degree of quiet running is achieved. In particular, a quiet running is achieved which can not be reached in otherwise known twin-cylinder reciprocating piston engines.

The effect which thereby occurs is relevant in particular for hybrid vehicles. As the twin-cylinder reciprocating piston engine is switched on in various driving situations, the otherwise usual intensive start-up vibrations do not arise in the power unit according to the invention, so that it remains essentially imperceptible for an occupant of such a hybrid vehicle whether the power unit is now active or not. Thus, a driving experience ensues that is otherwise only known from battery-electric vehicles.

In a preferred embodiment of the power unit according to the invention, the compensating mass is formed by a spring-loaded tappet. Such a spring-loaded tappet requires a small installation space, so that as a whole the power unit can be configured in a compact manner. A compact configuration is particularly preferred for the use in hybrid vehicles, because thus more space remains within the vehicle for the passenger compartment and/or a storage space.

The compensating mass, in particular the spring-loaded tappet, can be guided in a sleeve which extends essentially above the compensating camshaft parallel to the cylinders. In this way, mass movements of inertia of the second and higher order can be compensated particularly well, wherein at the same time a high degree of compactness of the power unit is achieved.

A particularly compact construction is achieved, in addition, when the compensating camshaft is formed by the camshaft. In other words, the camshaft, which is operatively connected with the control valves, can act simultaneously as a compensating camshaft. In this case, the camshaft also comprises the compensating cam element and in this respect is also operatively connected with the linearly guided compensating mass. This dual function of the camshaft as camshaft for the actuation of the control valves and as compensating camshaft leads to a particularly compact construction and, owing to the smaller number of components, also leads to a particularly favorably-priced production and installation of the power unit.

The compensating cam element can have two or four compensating cams. The number of compensating cams depends on how quickly the compensating camshaft rotates. When the compensating camshaft is formed by the camshaft, four compensating cams are expedient in order to compensate the mass forces of the second and higher order, as the camshaft usually rotates at half the crankshaft rotation rate. However, if the compensating camshaft is formed as a separate component and rotates, for example, at the same rotation rate as the crankshafts, then two compensating cams are sufficient in order to compensate the mass forces of the second and higher order.

In order to achieve the compensating mass being moved uniformly over the compensating cam element, provision is made advantageously that the compensating mass, in particular the spring-loaded tappet, has a rolling element or a sliding element. In operation, the rolling element rolls on an outer surface of the compensating cam element. The alternatively provided sliding element slides in operation on an outer surface of the compensating cam element.

In a further preferred embodiment of the power unit according to the invention, provision is made that the compensating camshaft has a first compensating cam element and a second compensating cam element. The first compensating cam element can be operatively connected with a first linearly guided compensating mass, and the second compensating cam element can be operatively connected with a second linearly guided compensating mass. Through the use of two compensating cam elements and two compensating masses associated therewith, tilting moments acting on the compensating camshaft can be prevented, which further contributes to the quiet running of the twin-cylinder reciprocating piston engine of the power unit.

In this respect, it is particularly preferred if the compensating cam elements are arranged at an equal distance to a center point of the compensating camshaft. When the compensating camshaft is formed by the camshaft, it is particularly preferred if the valve cams are arranged between the first compensating cam element and the second compensating cam element.

In a preferred variant, the compensating camshaft has a drive wheel, which is operatively connected with the first and/or the second crankshaft via a timing belt or a timing chain. The crankshafts, in particular the first crankshaft and the second crankshaft, preferably have spur gears respectively engaging into one another. It is particularly preferred if the drive wheel of the compensating camshaft is arranged on an engine side lying opposite the spur gears. Such a configuration leads, on the one hand, to the power unit as whole maintaining a very compact construction. On the other hand, tilting moments acting on the crankshafts can thus be compensated, which arise in that the crankshafts on the side lying opposite the drive wheel for example can be connected with the generator via a traction means or a gear drive, in particular with an intermediate gear.

A particularly compact configuration of the power unit is able to be achieved furthermore if, as is provided in a preferred embodiment, the sleeve is formed in one piece and/or integrally with a motor housing. In other words, the compensating mass can be guided linearly in a guide which is formed as part of the motor housing. For example, the motor housing can be formed as a casting, wherein in the casting a guide channel is provided for the compensating mass.

A coordinate aspect of the invention relates to a vehicle, in particular a hybrid vehicle with a previously described power unit.

Figure 2:
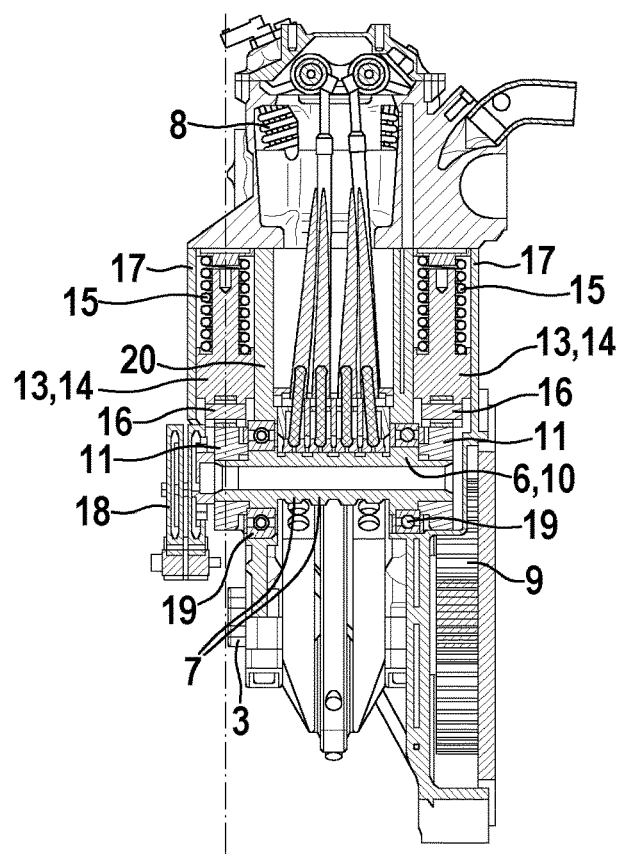
Figure 3:
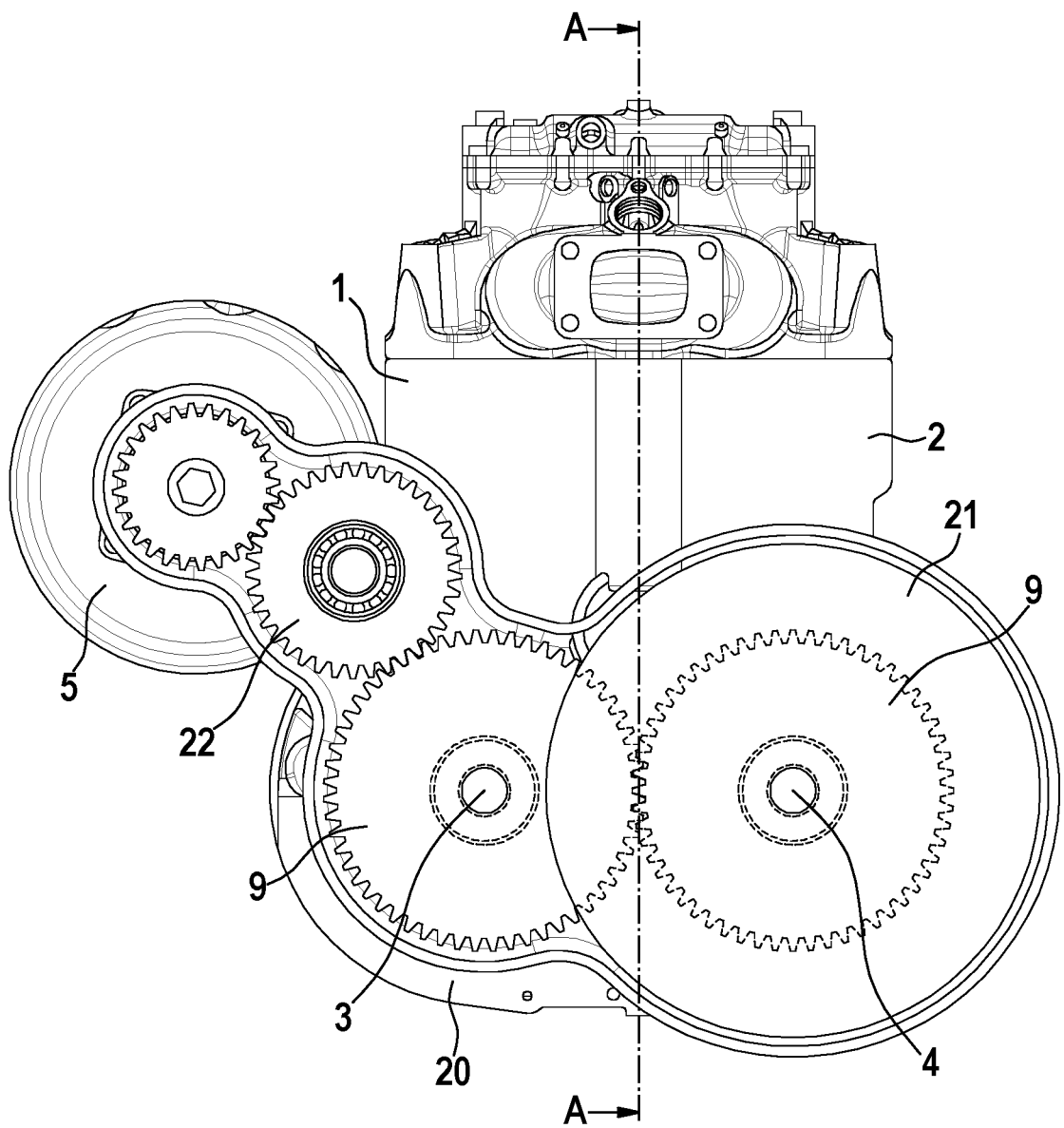

The invention is explained further below with the aid of an example embodiment with reference to the enclosed, schematic drawings. There are shown therein:

FIG. 1: a cross-sectional view of a power unit according to the invention according to a preferred example embodiment;

FIG. 2: a longitudinal sectional view through the power unit according to FIG. 1; and FIG. 3: a rear view of the power unit according to FIG. 1.

The power unit according to the example embodiment illustrated in the drawings comprises a twin-cylinder reciprocating piston engine with two cylinders 1, 2 and a generator 5, which is coupled with the reciprocating piston engine. The twin-cylinder reciprocating piston engine is embodied in tandem arrangement with cylinders 1, 2, wherein respectively a crankshaft 3, 4 is associated with each cylinder 1, 2. The crankshafts run parallel to one another and are rotatably coupled with one another via spur gears 9.

The generator 5 is operatively connected with a first crankshaft 3, so that the generator 5 has the same rotation direction as the first crankshaft 3. In practice, the generator 5 is coupled via an intermediate gear 22 with a spur gear 9 of the first crankshaft 3 (FIG. 3). The second crankshaft 4 likewise has a spur gear 9, which is rotatably connected with the spur gear 9 of the first crankshaft by a toothing. Here, the second crankshaft 4 rotates counter-directionally to the first crankshaft 3 and hence also counter-directionally to the generator 5.

In order to compensate the mass moments of inertia which are caused in particular through the generator 5, the reciprocating piston engine preferably has a flywheel mass element 21. In the example embodiment illustrated in the drawings, the flywheel mass element 21 is arranged on the second crankshaft 4. FIG. 3 shows the arrangement of the flywheel mass element 21 on the second crankshaft 4. The flywheel mass element 21 is preferably connected here with the spur gear 9 of the second crankshaft 4 in a non-rotatable manner.

Alternatively, it is possible to provide a separate flywheel mass compensating shaft which carries the flywheel mass element 21. The flywheel mass compensating shaft can be arranged, for example, in a mirror-inverted manner to the generator 5 and operatively connected with the second crankshaft 4. Alternatively, it is also possible that the flywheel mass element 21 is formed by a second generator 5 which is connected with the second crankshaft 4 in a mirror-inverted manner. This embodiment additionally has the advantage that the power unit can generate a higher electric output power.

For compensating the mass forces of the second order, in the example embodiment of the power unit illustrated in the figures, a compensating camshaft 10 is provided, which acts on the compensating masses 13, which move linearly and parallel to the piston in the cylinders 1, 2. In practice, the compensating camshaft 10 is formed by the camshaft 6, which serves for the activation of the control valves 8 of the reciprocating piston engine. In other words, the camshaft 6 has a dual function. On the one hand, it brings about the controlling of the control valves 8 and, on the other hand, it brings about in addition the linear movement of the compensating masses 13 and thus serves as compensating camshaft 10.

For the function as camshaft 6 for actuating the control valves 8, the camshaft 6 has several valve cams 7 (FIG. 2). The valve cams 7 are arranged between two ball bearings 19, which hold the camshaft 6 in a motor housing 20. Outside the ball bearings 19, the camshaft 6 or respectively compensating camshaft 10 has respectively compensating cam elements 11. In practice, two compensating cam elements 11, i.e. a first and a second compensating cam element 11, are provided. The compensating cam elements 11 are preferably spaced apart from the center point of the compensating cam shaft 10 by the same amount, so that tilting moments onto the compensating camshaft 10 are also compensated.

A compensating mass 13 is associated with each compensating cam element 11. In practice, the first compensating cam element 11 acts on a first compensating mass 13, and the second compensating cam element 11 acts on a second compensating mass 13. The compensating masses 13 are respectively formed as tappets 14 which are guided in sleeves 17. The sleeves 7 are an integral component part of the motor housing 20. In other words, the motor housing 20 has sleeve-like recesses, into which the tappets 14 are guided in a linear manner.

The tappets 14 are guided linearly in the respective sleeve 17 and acted upon with an elastic force via a spring 15. The elastic force of the spring 15, which is formed as a pressure spring, makes provision that the tappet 14 is pressed onto the compensating cam element 11. Thus, a continuous contact is guaranteed between the rolling element 16 and the compensating cam element 11.

A rolling element 16 is arranged between each tappet 14 and each compensating cam element 11. In particular, the rolling element can be formed as a roller. The roller can be ball-bearing mounted or sliding-bearing mounted. The roller or respectively the rolling element 16 rolls over the compensating cam element 11.

In the example embodiment according to the enclosed drawings, the compensating cam element 11 has respectively four compensating cams 12. The compensating cams 12 are arranged essentially in a star-shaped manner. In practice, the maxima of the compensating cams 12 can be arranged respectively at right-angles to one another.

Basically, a different number or configuration of the compensating cams 12 is possible. In the arrangement of the compensating camshaft 10, as is provided in the illustrated example embodiment, a symmetrical configuration of the compensating cam element 11 is expedient, because the compensating camshaft 10 is arranged centrally between the cylinders 1, 2. In an off-center or respectively eccentric arrangement, it can be advantageous if the compensating cams 12 are arranged asymmetrically.

Also the number of compensating cams 12 depends on the configuration of the compensating camshaft 10. In the illustrated example embodiment, the compensating camshaft 10 forms at the same time the camshaft 6, which in operation usually rotates half as quickly as the crankshafts 3, 4. In this case, for compensation of the mass moments of inertia of the second order, four compensating cams 12 are expedient. In variants of the power unit in which the compensating camshaft 10 is provided separately from the camshaft 6 and for example rotates at the same rotation speed as the crankshafts 3, 4, two compensating cams 12 can be sufficient. Such an embodiment is expedient for example when the twin-cylinder reciprocating piston engine is to be equipped with overhead camshafts 6. Then, the compensating camshaft 10 is provided exclusively for the compensation of the mass moments of inertia of the second order and does not have the dual function as additional camshaft 6 for activation of the control valves 8.

In FIG. 2 it can be seen that the camshaft 6 or respectively compensating camshaft 10 has a drive wheel 18 on an engine side lying opposite the spur gears 9 of the crankshafts 3, 4. The drive wheel 18 can be formed as a toothed wheel and can be connected with one of the crankshafts 3, 4 via a timing chain. Alternatively, the drive wheel 18 can also be connected with one of the crankshafts 3, 4 by drive belts. In the illustrated example embodiment, the drive wheel 18 is dimensioned so that the camshaft 6 or respectively compensating camshaft 10 rotates, in operation, half as quickly as the crankshafts 3, 4.

Through the compensation of mass moments of inertia and of the mass forces of the second order, the twin-cylinder reciprocating piston engine of the power unit runs particularly quietly. Therefore, the power unit is particularly suitable as a component part of a drive train of a hybrid vehicle, which is driven primarily by means of electric motors. The power unit serves here as power generator for the electrical energy which is required for the drive of the hybrid vehicle. The quiet running of the twin-cylinder reciprocating piston engine makes it possible in particular to connect the power unit according to the driving situation without, in so doing, transferring intrusive vibrations into the vehicle interior. Moreover, the noise emissions are massively reduced, so that as a result a driving experience can occur in the hybrid vehicle which corresponds to the driving impression of a purely electrically driven vehicle.

LIST OF REFERENCE NUMBERS 1, 2 cylinder
3 first crankshaft
4 second crankshaft
5 generator
6 camshaft
7 valve cam
8 control valve
9 spur gear
10 compensating camshaft
11 compensating cam element
12 compensating cam
13 compensating mass
14 tappet
15 spring
16 rolling element
17 sleeve
18 drive wheel
19 ball bearing
20 engine housing
21 flywheel mass element
22 intermediate gear

The invention claimed is:
1. A power unit, with
a twin-cylinder reciprocating piston engine causing first and second order mass forces, which has two pistons that are guided in two cylinders in tandem arrangement, and two counter-directional crankshafts which are connected with the two pistons by connecting rods,
at least one generator, which is rotatable co-directionally to a first crankshaft of the two counter-directional crankshafts and counter-directionally to a second crankshaft of the two counter-directional crankshafts, and
a camshaft having valve cams, which are operatively connected with control valves,
characterized in that a flywheel mass element, which is arranged on the second crankshaft or on a flywheel mass compensating shaft,
wherein the camshaft is designed to compensate the second order mass forces, wherein the camshaft comprises at least two compensating cam elements, a first compensating cam element and a second compensating cam element, wherein the first compensating cam element is operatively connected with a first linearly guided compensating mass, and the second compensating cam element is operatively connected with a second linearly guided compensating mass, wherein the first compensating mass and the second compensating mass move linearly and parallel to each of the pistons in the cylinders,
wherein the at least two compensating cam elements has four compensating cams, wherein the camshaft rotates half as quickly as the first and second crankshafts.

2. The power unit according to claim 1,
characterized in that
the first linearly guided compensating mass and the second linearly guided compensating mass is formed by a spring-loaded tappet.

3. The power unit according to claim 2, characterized in that the first linearly guided compensating mass and the second linearly guided compensating mass is guided in a sleeve which extends essentially above the camshaft parallel to the cylinders.

4. The power unit according to claim 3,
characterized in that
the sleeve is formed in one piece and/or integrally with a motor housing.

5. The power unit according to claim 1,
characterized in that
the valve cams are arranged between the first compensating cam element and the second compensating cam element.

6. The power unit according to claim 1, characterized in that the camshaft has a drive wheel which is operatively connected with the first and/or the second crankshaft via a timing belt or a timing chain.

7. The power unit according to claim 1,
characterized in that
each crankshaft has a spur gear, the spur gears respectively engaging into one another.

8. The power unit according to claim 1, characterized in that; the camshaft has a drive wheel which is operatively connected with the first and/or the second crankshaft via a timing belt or a timing chain; each crankshaft has a spur gear, the spur gears respectively engaging into one another; and the drive wheel is arranged on an engine side lying opposite the spur gears.

9. A vehicle with the power unit according to claim 1.

10. The power unit according to claim 1, characterized in that, the first linearly guided compensating mass and the second linearly guided compensating mass has a rolling element, which, in operation, rolls on an outer surface of the first and second compensating cam element and the first and second compensating cam element are arranged at an equal distance to a center point of the camshaft.

* * * * *